Dec. 23, 1969  E. N. GLICK  3,485,102

ELECTRONIC TEMPERATURE MEASURING DEVICE

Filed April 17, 1967  2 Sheets-Sheet 1

INVENTOR
Ezra N. Glick

BY Pennie, Edmonds, Morton, Taylor & Adams
ATTORNEYS

Dec. 23, 1969   E. N. GLICK   3,485,102
ELECTRONIC TEMPERATURE MEASURING DEVICE
Filed April 17, 1967   2 Sheets-Sheet 2

INVENTOR
EZRA N. GLICK

BY
Pennie, Edmonds, Morton, Taylor & Adams
ATTORNEYS

United States Patent Office 3,485,102
Patented Dec. 23, 1969

3,485,102
ELECTRONIC TEMPERATURE MEASURING DEVICE
Ezra N. Glick, Yonkers, N.Y., assignor to Allied Precision Laboratories, Inc.
Filed Apr. 17, 1967, Ser. No. 631,474
Int. Cl. G01k 5/18, 5/72, 5/52
U.S. Cl. 73—362          4 Claims

ABSTRACT OF THE DISCLOSURE

An electronic temperature measuring device having a thermistor sensing element which is mounted in a probe in such a manner as to be shielded from body acids and the like, and a Wheatstone bridge circuit, one arm of which includes the thermistor, to indicate the temperature sensed by the thermistor.

BACKGROUND OF THE INVENTION

Field of the invention

This invention relates to medically applicable devices for measuring body temperature, for example, of patients who are ill or who are undergoing surgical procedures. There is needed in such instances an inexpensive and accurate device for rapid measurement of the temperature of a human or animal body. Moreover, such a device should be capable of rendering an indication of the temperature of the body to be measured at a point remote from that body so that, for example, temperatures of all patients in a hospital ward can be remotely monitored at a central monitoring location.

Description of the prior art

The most common temperature measuring device for medical applications is the mercury thermometer, which is used almost exclusively by hospitals for body temperature measurement.

Electric and electronic devices for temperature measurement have been suggested (some using thermocouples and the like) and are in widespread use in engineering applications other than the medical field. However, no electronic device for measuring body temperature has been developed which is in all respects suitable for medical applications, as attested to by the fact that the mercury thermometer is today used almost exclusively for that purpose.

SUMMARY OF THE INVENTION

This invention is based on the discovery that an electronic temperature measuring device highly suitable for hospital and other medical use results from the combination of a probe, including a thermistor and means for shielding the thermistor from body acids and the like while allowing the thermistor to be placed in thermal communication with a body to measure its temperature, and measuring means including a Wheatstone bridge circuit, one arm of which includes the thermistor. Preferably, the body of the probe may be made of polytetrafluoroethylene or stainless steel, both of which are substantially impervious to body oils and acids, and may be shaped according to its intended use, which in most cases will be either axillary, rectal or oral temperature measurement.

For applications in which it is desired to monitor the temperatures of many patients (for example, in a hospital ward) at a central monitoring station, probes may be provided at the locations of each of the patients, and may be electrically connected through a central switching unit to a single measuring unit. The central measuring unit is then capable of indicating the temperature sensed by any one of the remote probes, depending on which probe is connected to it through the central switching unit.

Each probe corresponding to a particular bed, or patient, may be of any of the three types mentioned above, that is, axillary, rectal or oral. Such probes may be shaped similarly to mercury thermometers intended for corresponding applications. Other types of probes may also be used; for instance, a relatively flat probe may be provided capable of being taped to the skin surface. The probes may be placed in contact with the patients only at specified times, when it is desired to take their temperatures, or the probes may be left taped or otherwise fastened to the patients, so that the temperature of any one of them may be read at any time at the measuring unit.

BRIEF DESCRIPTION OF THE DRAWINGS

The invention will be described in conjunction with the accompanying drawings, in which.

DESCRIPTION OF THE PREFERRED EMBODIMENTS

Figure 1:
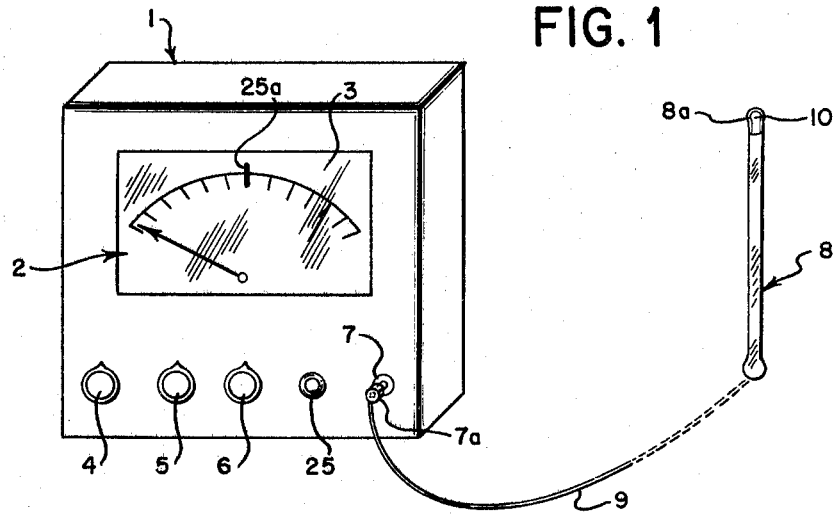
FIG. 1 is a front elevation of a temperature measuring device for medical application constructed in accordance with the invention.

FIG. 1 illustrates an embodiment of the invention wherein a housing 1 for the measuring unit, which housing is provided with a window 2, contains an ammeter 3, the indicating dial of which is viewable externally through the window 2. As used herein the term "ammeter" connotes any current sensing device, and includes milliameters, microammeters, etc. Adjustment knobs 4, 5 and 6 control variable resistances, to be described, for adjusting the set points at the high and low ends of the indicating range of the device and for testing the device. A socket 7 is provided on the housing 1 for connecting to the measuring unit a probe 8, by means of a connecting cable 9. The connecting cable 9 terminates at the housing 1 in a plug 7a which connects into the socket 7. A thermistor 10 is provided in the tip of the probe 8 in such manner that it may be placed in thermal communication with a body to measure its temperature. The thermistor 10 may be fully encased in the probe material (i.e. polytetrafluoroethylene), with a thin layer of that material 8a covering the surface of the thermistor which is to be in contact with the body, to permit efficient heat transfer between the body and the thermistor. If the probe material is a thermal insulator such as polytetrafluoroethylene, the thickness of the layer 8a may be on the order of a fraction of a millimeter (e.g. .05 mm.). If the probe material is a good thermal conductor layer 8a may be thicker, but in general the thinner it is, the faster the thermal time constant of the device will be. If the thermistor itself is encapsulated in metal or has a metal heat sensing portion, that portion may be left exposed, and the remainder of the thermistor sealed into the probe, so that no thickness of probe material is interposed between the thermistor and the body to be measured to impede heat transfer therebetween. The probe 8 is formed so as to securely hold and maintain the thermistor. The two electrical leads (not shown) of the thermistor extend through the probe 8 and out the end thereof opposite the thermistor itself. The connection between the probe 8 and the cable 9 should provide a seal for preventing body acids, oils and the like from corroding the leads.

Figure 4:
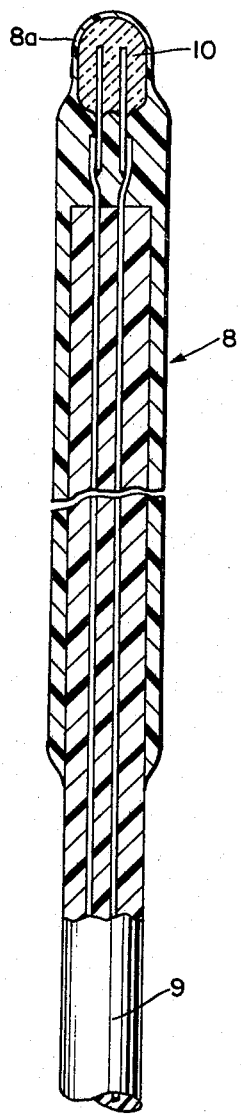
FIG. 4 is a detailed view of a probe and a sheathed cable connected thereto.

FIG. 4 shows a particular construction of a probe and a sheathed cable attached thereto in accordance with the invention wherein the probe 8 is an elonged member having a thermistor 10 embedded therein at one end thereof. The probe completely surrounds the thermistor so that only a thin layer of the probe material covers the surface of the thermistor in contact with the body of the patient. In one embodiment of the invention, the probe is made of polytetrafluoroethylene and in another embodiment, the probe is made of stainless steel. In the first mentioned embodiment the electrical cable 9 attached to the probe has a neoprene sheath and in the second embodiment the sheath 9 is made of polypropylene. The sheath is tightly joined to the probe body, as shown in FIG. 4, to exclude body acids, oils and the like therefrom.

Figure 2:
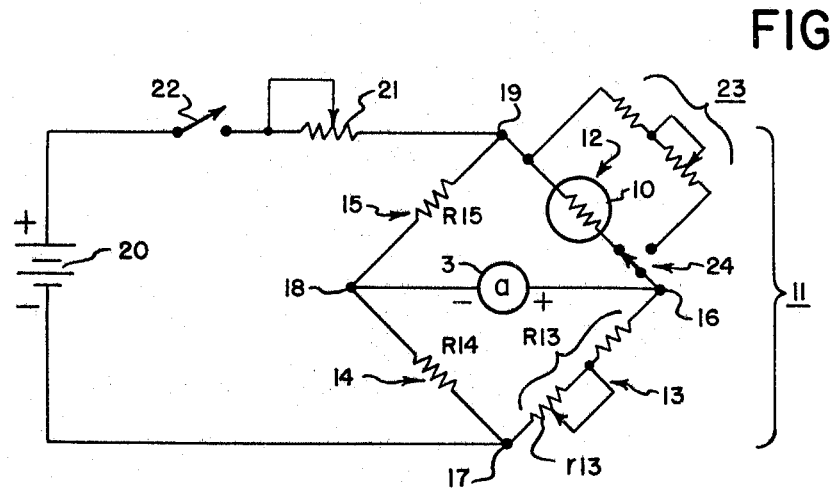
FIG. 2 is a schematic diagram of the circuit of the device shown in FIG. 1.

FIG. 2 is a schematic diagram of the circuit of the device of FIG. 1. A Wheatstone bridge circuit 11 is provided within the housing 1 and includes four arms, 12, 13, 14 and 15. Each of the arms 13, 14 and 15 contains a respective resistive elements $R_{13}$, $R_{14}$ and $R_{15}$, and the arm 12 contains as a resistive element the thermistor 10. Although the leads from the thermistor 10 are schematically shown as connected directly into the Wheatstone bridge circuit 11, they are in fact connected through the cable 9 and plug and socket 7a, 7. For reference, the junctions between the various arms of the Wheatstone bridge 11 are designated as follows: arms 12 and 13 are joined at junction 16; arms 13 and 14 are joined at junction 17; arms 14 and 15 are joined at junction 18; and arms 15 and 12 are joined at junction 19.

A voltage source 20 is connected in series with a variable resistor 21 and a switch 22 between junctions 17 and 19 for providing current through the Wheatstone bridge circuit 11. A galvanometer or other current sensitive device such as an ammeter 3 is connected between junctions 16 and 18 so that the current which it indicates is a measure of the imbalance of the Wheatstone bridge circuit.

The Wheatstone bridge circuit will be in balance when the voltage difference between junctions 18 and 16 is zero, so that the ammeter 3 indicates zero current. This condition is achieved when the following resistance equation is satisfied:

$$R_{15}/R_{14}=R_{12}/R_{13}$$

As the thermistor 10 is subjected to varying temperatures, its resistance changes, thereby varying the balance condition of the Wheatstone bridge circuit 11, as will be apparent from the above equation. The consequent variation in the current through the ammeter 3 is related to this change in temperature, so that the scale of ammeter 3 may be calibrated directly in terms of the temperature sensed by the probe 8.

In order to properly calibrate the scale of the ammeter 3 for a particular thermistor, the end points of the temperature indicating range of the ammeter 3 are adjusted by means of the adjustment knobs 4 and 5 which control the variable resistors $R_{13}$ and $R_{21}$ respectively. Although the internal flexibility afforded by the invention is such that a temperature range from about $-40°$ F. to $+160°$ F. can be indicated, a convenient temperature range for most medical applications is between 96° and 106° F. If the ammeter 3 is connected in the Wheatstone bridge circuit 11 with its positive and negative terminals as shown, then a temperature increase sensed by the thermistor 10 will lower its resistance, thereby increasing the current through the ammeter 3, which is indicated as an increase in temperature. To calibrate the device, the probe 8 containing the thermistor 10 is brought to a known temperature of 96° F. With the variable resistance $R_{13}$ set at a relatively low resistance value, the variable resistance $R_{13}$ is adjusted so that the ammeter 3 reads 96° F., which is equivalent to zero current. At this point the Wheatstone bridge circuit is balanced, and the ammeter 3 is indicating what is known to be the correct temperature sensed by the thermistor 10, that is, 96° F. Then the probe containing the thermistor 10 is brought to a known temperature of 106° F., and the variable resistance 21 is adjusted so that the ammeter 3 indicates 106° F. The end points of the temperature range having been thus determined, the linearity of the thermistor is usually sufficient so that all intermediate temperatures will be accurately indicated; if not, the calibrations on the dial of the ammeter 3 may be drawn so as to compensate for any non-linearity.

In order to test the voltage source 20, which in this embodiment is a battery, and preferably a mercury battery, a variable resistance 23 adjustable by the knob 6 is provided in parallel with the thermistor 10 so that by means of a single-pole-double-throw switch 24, the thermistor 10 may be replaced as arm 12 of the Wheatstone bridge circuit by the variable resistance 23. The switch 24 may conveniently be actuated by a push-button 25 (FIG. 1), so that the thermistor 10 is normally connected in the Wheatstone bridge circuit 11, and is replaced therein by the variable resistance 23 only when the push-button 25 is pressed. A special "test" indicia 25a may be provided on the scale of ammeter 3 and, after the unit has been calibrated as explained above, the push-button 25 may be depressed and variable resistance 23 adjusted so that the ammeter needle points to such "test" indicia 25a. Tests may then be made at any time merely by depressing the push-button 25; if the ammeter needle does not point to the "test" indicia 25a, it means that a new battery is needed or possibly that some other malfunction has occurred.

It is not necessary to test the device that any of the adjustment knobs 4, 5 and 6 be moved. They need only be set to given positions when the device is initially adjusted. For this reason the adjustment knobs may advantageously be provided with set screws or the like to lock them in position. If the device is to be used with more than one probe, it will be necessary to determine the end points of the indicating range of the ammeter 3 corresponding to each particular thermistor. Similarly, a new setting of the variable resistance 23 will be required for each set of end points. Numbered indicia (not shown) should therefore be provided adjacent each of the knobs 4, 5 and 6 so that they can be reset to their respective positions without recalibrating the device. Conveniently, the proper settings of adjustment knobs 4, 5 and 6 corresponding to each probe may be inscribed on that probe.

Figure 3:
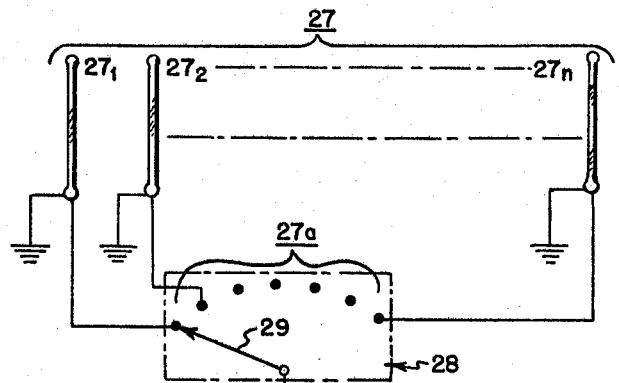
FIG. 3 is a schematic diagram of a remote temperature measuring apparatus for indicating the temperature sensed by any one of a plurality of probes, constructed in accordance with the invention.

FIG. 3 illustrates an embodiment of the invention wherein a single measuring unit 26 is provided with a plurality of probes 27 ($27_1$–$27_n$), any one of which may be connected to the measuring unit 26 by means of a switching unit 28. Each of the probes 27 may be provided at a respective hospital bed, for instance, so that the temperature of any patient in, say, a ward may be measured from a central point at which the switching unit 28 and measuring unit 26 are located. At least one wire from each of the probes 27 is connected to a respective terminal 27a of the switching unit 28, any one of which terminals 27a may be connected through a movable contact 29 with the measuring unit 26. If the probes are permanently affixed to the respective patients the temperature of any one of them may be accurately and quickly determined merely by contacting the associated contact 27a of the switching unit 28 through the movable contact 29.

If desired, the current through the ammeter 3 may be used to control a recorder (not shown) of the type which permanently records on a moving chart the value of some variable, in this case temperature, which changes with time. One such recorder may be connected in circuit with each probe, for instance through its associated contact 27a, so that a complete and continuous record of the patients' temperatures are obtained. Alternatively, a single recorder may be provided having multiple channels corresponding to the respective probes $27_1$–$27_n$.

It will be apparent that the invention is not limited to the specific features in the above described preferred em-

I claim:
1. A temperature measuring device for medical applications capable of highly accurate measurement of body temperature with a rapid response time and which is inexpensive to make, maintain and use, comprising:
   a probe, including a thermistor mounted therein and formed so as to shield the thermistor from body acids and the like while allowing said thermistor to be placed in thermal communication with such body to measure its temperature; and
   measuring means for measuring the temperature sensed by said probe, including a Wheatstone bridge circuit having first, second, third and fourth arms, one of which includes said thermistor connected in circuit as part thereof, whereby changes in the resistance of said thermistor with the temperature sensed by said probe are detected as changes in the balance of said Wheatstone bridge circuit;
   said probe being an elongated polytetrafluroethylene member having said thermistor embedded therein at one end thereof, said probe completely surrounding said thermistor so that only a thin layer of polytetrafluoroethylene covers the surface of the thermistor intended to contact such body, said device including an electrical cable having a neoprene sheath connecting said thermistor with said Wheatstone bridge circuit, said neoprene sheath being tightly joined to said probe to exclude body oils and the like therefrom.

2. A temperature measuring device as defined in claim 1 wherein:
   (1) said thermistor is connected in circuit as said first arm of the Wheatstone bridge circuit and said second arm includes a resistive element and is connected to said first arm at a first junction;
   (2) said third arm includes a resistive element and is connected to said second arm at a second junction;
   (3) said fourth arm includes a resistive element and is connected to said third arm at a third junction; and
   (4) said first arm is connected to said fourth arm at a fourth junction; and
   said Wheatstone bridge circuit includes
      (1) a voltage source and a first variable resistance connected in series between said second and fourth junctions; and
      (2) indicating means connected between said first and third junctions for indicating the temperature sensed by said thermistor.

3. A temperature measuring device as defined in claim 2 wherein one of said second, third and fourth arm includes a second variable resistance, said first and second variable resistances being adjustable to calibrate the measuring means at the ends of the measurement range thereof, said device including a third variable resistance disposed to be connected as said first arm of the Wheatstone bridge circuit in place of said thermistor, and means for connecting either said thermistor or said third variable resistance in said Wheatstone bridge circuit as the first arm thereof; a housing for said measuring means, a sheathed cable for connecting said thermistor to said Wheatstone bridge circuit and including connecting means, a part of which is mounted on said housing, for removably connecting the thermistor to the Wheatstone bridge circuit; and wherein said voltage source is a battery contained within said housing, and said indicating means is an ammeter contained within said housing, so that said devices is portable and self-contained and any one of several probes containing thermistors may be connected as part of said device through said connecting means.

4. A device as defined in claim 3 including recording means connected to sense the voltage difference between said first and third junctions for recording the temperature sensed by said thermistor as function of time.

References Cited
UNITED STATES PATENTS

| | | | |
|---|---|---|---|
| 2,321,846 | 6/1943 | Obermaier | 338—28 XR |
| 2,649,715 | 8/1953 | Goble. | |
| 2,938,385 | 5/1960 | Mack et al. | |
| 3,036,464 | 5/1962 | Beeston | 73—342 |
| 3,077,514 | 2/1963 | Kang | 174—120 |
| 3,087,338 | 4/1963 | Horbinski et al. | |
| 3,153,769 | 8/1964 | Moses | 338—28 |
| 3,221,555 | 12/1965 | Biber. | |
| 3,367,186 | 2/1968 | Ensign et al. | |
| 3,377,862 | 4/1968 | Gheorghin. | |
| 3,402,378 | 9/1968 | Catlin et al. | |

LOUIS R. PRINCE, Primary Examiner

FREDERICK SHOON, Assistant Examiner

U.S. Cl. X.R.

73—342; 338—28